J. R. ROGERS.
DEVICE FOR TRANSMITTING POWER.
APPLICATION FILED MAR. 18, 1915.

1,256,596.

Patented Feb. 19, 1918.
3 SHEETS—SHEET 2.

Inventor
John R. Rogers
By his Attorneys

UNITED STATES PATENT OFFICE.

JOHN R. ROGERS, OF BROOKLYN, NEW YORK.

DEVICE FOR TRANSMITTING POWER.

1,256,596.

Specification of Letters Patent. Patented Feb. 19, 1918.

Application filed March 18, 1915. Serial No. 15,202.

*To all whom it may concern:*

Be it known that I, JOHN R. ROGERS, a citizen of the United States of America, and resident of the borough of Brooklyn, county of Kings, city and State of New York, have invented certain new and useful Improvements in Devices for Transmitting Power, of which the following is a full, clear, and exact specification.

My invention relates to a device for transmitting power and the object of the invention is to produce a device for the purpose described, whereby the ratio of power in the driving shaft to the resistance in the driven shaft is automatically controlled by the variation of said resistance. In other words, to provide means whereby a varying resistance to the power will produce a varying ratio of gearing between the driving and driven shafts. The device will be found useful in all types of machines wherein it is necessary to transmit power but, as illustrated, is shown only in connection with automobiles to which use, however, the application of the invention is not confined, as I believe it will find wide application in the art wherever an automatic variation in the ratio of resistance to power is required.

In the following I have described, in connection with the accompanying drawings, several forms of devices illustrating the embodiment of the principles of my invention, the features thereof being more particularly pointed out hereinafter in the claims.

In the drawings.

Similar numerals of reference indicate similar parts throughout the several views.

Figure 1:
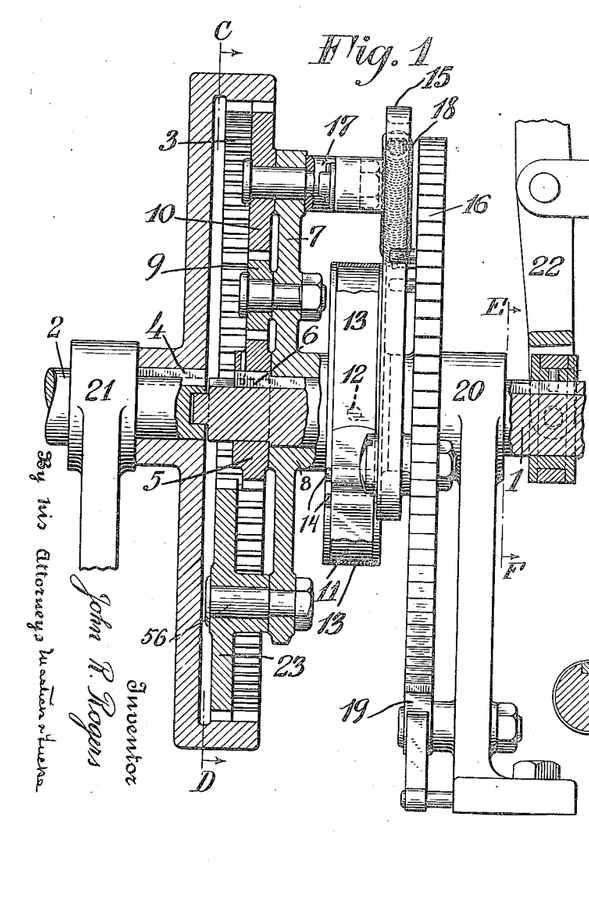
Figure 1 is a side view along the line A—B of Fig. 2 looking in the direction of the arrows, partly in section and partly broken away, illustrating one form of device to which the principles of my invention have been applied.
Figures 2, 3:
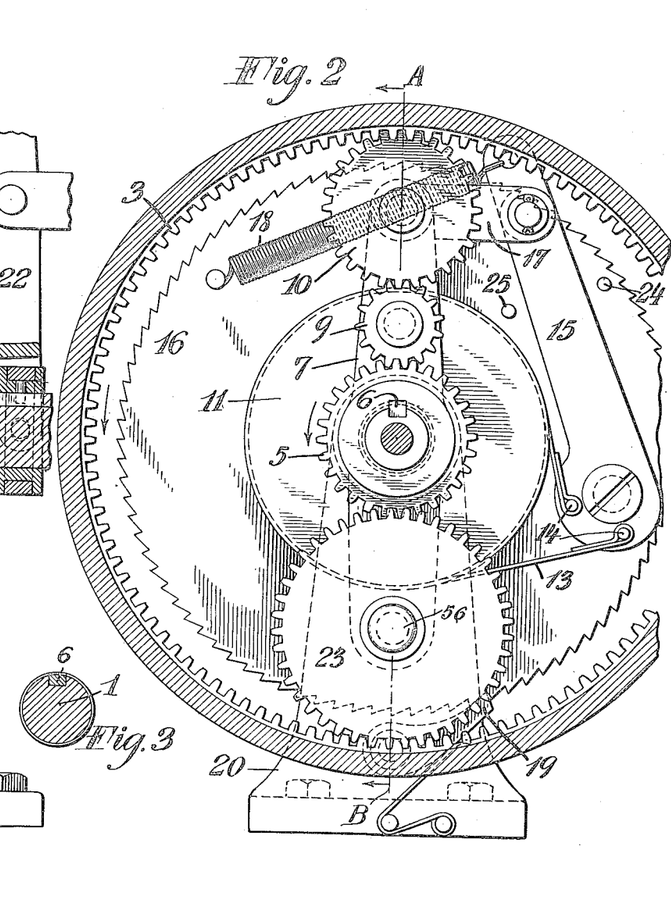
Fig. 2 is a cross-sectional view of the same along the line C—D of Fig. 1 looking in the direction of the arrows, parts being broken away.
Fig. 3 is a cross-sectional view of a detail of construction, along the line E—F of Fig. 1 looking in the direction of the arrows.

Referring first to the form of device illustrated in Figs. 1 to 3 inclusive, 1 indicates the driving shaft and 2 the driven shaft. In an automobile for example, 1 would preferably be an extension of the crank shaft and 2 an extension of the shaft causing torque on the rear wheels. 3 indicates an internally toothed gear mounted on driven shaft 2 and fastened thereto against rotation thereon by spline or key 4. 5 indicates a driving gear mounted upon shaft 1 and held thereto against rotation by a spline 6, said spline permitting this gear to be moved for a short distance longitudinally along the driving shaft 1. 7 indicates an arm carried by a collar 8 loosely mounted on driving shaft 1. 9 and 10 indicate interlocking gears rotatably mounted on arm 7, the driving gear 5 and interlocking gears 9 and 10 normally forming a train of gears in mesh with the teeth of the internally toothed gear 3. 11 indicates a clutch disk rigidly secured to the driving shaft 1 by means of a pin 12. 13 indicates a clutch band surrounding clutch disk 11 and connected at its two ends by means of pins 14, 14, to one arm of a lever 15. Lever 15 is pivotally mounted on a toothed plate 16, loosely mounted on driving shaft 1, said toothed plate being hereafter called a reaction-plate, the function of which will be hereinafter more particularly described. 17 indicates a link pivotally secured at one end to lever 15 near the opposite end thereof from the point where lever 15 is secured to plate 16, the other end of link 17 being pivotally secured to the upper end of arm 7, as shown in Fig. 2. 18 indicates a spring having one end secured to the reaction-plate 16 and the other end secured to the upper end of lever 15, said spring tending to pull the lever 15 in the direction of rotation of the driving gear 5, as shown by the arrow in Fig. 2. The action of the spring 18 through the lever 15 tends to tighten the clutch band 13 upon the clutch disk 11.

The reaction-plate 16 as above set forth, is mounted loosely upon the driving shaft 1 and is free to move in the direction of rotation of the driving gear 5, but is restrained from moving in the opposite direction by the pawl 19 taking into the teeth on the periphery of plate 16. 20, 21 indicate bearings for the driving and driven shaft respectively and 22 indicates a lever for sliding the driving gear 5 longitudinally on the driving shaft 1. 23 indicates a gear rotatably mounted on stud 56 carried by arm 7 out of alinement with gears 9 and 10, but in mesh with the internal gear of gear 3 and adapted to be engaged by driving gear 5 when the latter is disengaged from gear 9 and thrown into mesh with said gear 23 when driving gear 5 is caused to move longitudinally on driving shaft 1 toward the driven shaft 2 in order to reverse the direction of rotation of said gear 3.

The operation of the device shown in Figs. 1 and 2 is as follows: Let it be assumed that the device has been applied to an automobile and that the automobile is about to be started from a position of rest. In such case with the ordinary transmission means, it is generally necessary to shift the gears so as to give the driving shaft, through the gearing, a leverage of about three to one over the driven shaft, the coefficient of inertia being figured roughly at about three. The driving gear 5 (see Fig. 2) acting through the intermediate gear 9 rotates gear 10 which in turn drives the internally toothed gear 3 in the direction of the arrow and in the same direction as the direction of rotation of the driving gear 5. The reaction against the resistance of the gear 3 tends to cause the gear 10, carrying arm 7 along with it, to travel along the internally toothed gear 3 in a direction opposite to the arrow thus displacing the axes of the gears 9 and 10 to the right (Fig. 2). This movement through the link 17 moves the lever 15 to the right, thus releasing the clutch band 13 from clutch disk 11. This movement may be continued until the lever 15 strikes against stop 24, stop 25 limiting the movement of lever 15 in the other direction. The movement of the lever 15, or of any equivalent device performing the same function, need only be sufficient for the tightening or loosening of the clutch band 13. When this occurs the pawl 19 prevents the rotation of the reaction-plate 16 and the train of gears 5, 9 and 10 drive the gear 3 in the direction of the arrow. The ratio of power between the driving gear 5 and the driven gear 3 is of course in proportion to the respective sizes of said driving and driven gears and in this case is roughly 3 to 1, the power of the driving shaft 5 having an advantage of 3 to 1, including friction, over the gear 3 connected with the rear wheels of the automobile, which advantage is the same advantage as is now gained for the purpose of starting by throwing the shifting lever into "low gear".

When the automobile has been started and the inertia of the car has been overcome, the resistance of the gear 3 decreases. When this resistance has decreased to a sufficient extent the spring 18 on the reaction-plate 16 tends to pull the lever 15 back to its normal position, thereby tightening the clutch band 13. When the clutch band 13 is tightened sufficiently so that the friction between the clutch band and the drum is greater than the resistance of the gear 3, the reaction-plate 16 begins to move with the arm 7 and the whole device, that is the reaction-plate 16 and the arm 7 revolves in unison with the gear 3. At this time there is no movement of rotation of gears 9 and 10, on their respective axes, the power being transmitted through those teeth on gear 10 which happen to be in mesh with the gear 3. In other words, every revolution of the shaft 1 produces a corresponding revolution of the shaft 2. This is exactly equivalent to what is ordinarily known as "high gear" or "direct driving" in an ordinary automobile.

From the foregoing description, it is clear that when the resistance on the gear 3 is very great, the gears automatically gain an advantage of 3 to 1. When the resistance is sufficiently reduced, the action of the train of gears ceases and the driving is "direct". This gives two speeds and is equivalent to a two-speed transmission of sliding gears.

Experiments have shown that a number of intermediate speeds may be obtained with this device, such intermediate speeds being obtained in the following manner: When the resistance of the gear 3 is reduced so that the spring 18 begins to set the clutch band 13, as above described, a point is reached where the friction of the clutch band 13 on the clutch disk 11 is nearly equal to the resistance of the gear 3. At this point the friction of the clutch band tends to make the gear 3 run "direct", that is, one revolution of the crank shaft producing one revolution of the gear 3. The gear 10 which is also rotating tends to overcome the resistance of the gear 3 in the ratio of 3 to 1. The combination of these two forces produces a large number of intermediate speeds between the ratio of 3 to 1 and 1 to 1, the variation being exactly proportional to the relation of the power of the driving shaft 1 and the resistance on the driven shaft 2.

The ultimate result is that the speed of the gear 3 is in direct proportion to the ratio between the resistance of the gear 3 and the power applied to the driving shaft 1, and varies with the variation in either the resistance or the power applied. It will be noted that this result is obtained automatically without any attention on the part of the driver or operator of the machine.

It will be noted that when the resistance in the driven shaft is comparatively slight the driving shaft turns the driven shaft through the clutch which acts through the gears. At this time the gears are locked together and do not perform the function of gears but merely that of a lever for transmitting the power to the driven gear 3. This I call transmitting the power "directly". When the clutch is relaxed the driving shaft turns the driven shaft by the gears which turn and act as ordinary gears. This I call transmitting the power "indirectly". At other times the clutch band exercising friction on the clutch disk and the gears turning at the same time, the driving shaft turns the driven shaft both "directly" and "indirectly", that is to say, both by friction on the clutch disk and through the revolving gears. In other words, by "directly" is meant, rotation of the driven shaft in the same direction as the rotation of the driving shaft by rotation of the gear wheels about the axis of the driving shaft, the gear wheels themselves being stationary on their own axes; and by "indirectly" is meant rotation of the driven shaft in the same direction as the rotation of the driving shaft by rotation of the gear wheels on their own axes, and where I use the term "direct driving means" I means to include both the clutch, and the gears through which it acts, although these latter may not be rotating on their own axes at the time, and where I use the term "indirect driving means" I mean to include the gears alone, when they are rotating on their own axes. It is to be understood, however, in this connection, that the description with reference to a clutch for direct drive and gearing for indirect drive is merely illustrative of the principle and that other mechanism than a clutch may be used in the one case, or other means than gearing, in the other case, and that such substitution of means is within the spirit of my invention.

It will be further noted from the foregoing that there is a clear distinction between the action of the driving shaft upon the driven shaft whether through the gears, acting as a lever, or by the revolving gears when performing their usual function.

It will be further noted that when the gears are actually revolving the action of said gears or the power transmitted through them performs two entirely distinct functions viz: the action of the gears tends to drive the gear 3 forward in the direction of the arrow and at the same time to pull the arm 7 in the opposite direction. This movement of the arm controls the action of the clutch band 13. As the arm 7 moves in the direction opposite to the arrow thereby loosening the clutch band 13, a point is reached where the power driving gear 3 forward is less than the friction of the clutch band 13 on clutch disk 12. When this point is reached the further movement of the arm in the direction opposite to the arrow, is stopped by the plate 16 and the pawl 19. I call this combination of plate and pawl a "reaction device" and this must be distinguished from the expression "reaction mechanism" which refers to the means governing the movement of the arm 7 in its control of the clutch. When the power is entirely transmitted through the gears (low gear) the reaction of the power so transmitted is against the reaction device which is stationary and which corresponds to the stationary clutch frequently used in planetary gearing. When the power is being transmitted partly through the gears and partly through the clutch band (intermediate speeds) the reaction of the power transmitted through the gears is not against the "reaction device" but against the friction of the clutch band against the clutch disk, said friction being controlled by the "reaction mechanism", that is to say, the arm 7, link 17, lever 15 and clutch band 13.

As it is necessary in an automobile to provide for a reverse action of the driven shaft in order to back the car, I have provided the gear 23 mounted on stud 56 carried by arm 7 as hereinabove described, so that when the driving gear 5 is shifted to mesh with gear 23, gear 3 will be given a movement opposite to the arrow, thus reversing the movement of the driven shaft. The particular manner of accomplishing this latter result is not essential.

It will be noted that the only time when the train of gears 5, 9 and 10 and the driven gear 3 are out of mesh, or in other words, the only time when the shifting of the gears is required, is when the rotation of the driven shaft is to be reversed. At all other times in an automobile for example, the speed of the automobile will be entirely governed by the throttle and the transmission device will automatically give the highest speed to the driven gear 3 and to the car that is possible with the power applied to the shaft 1.

Figure 4:
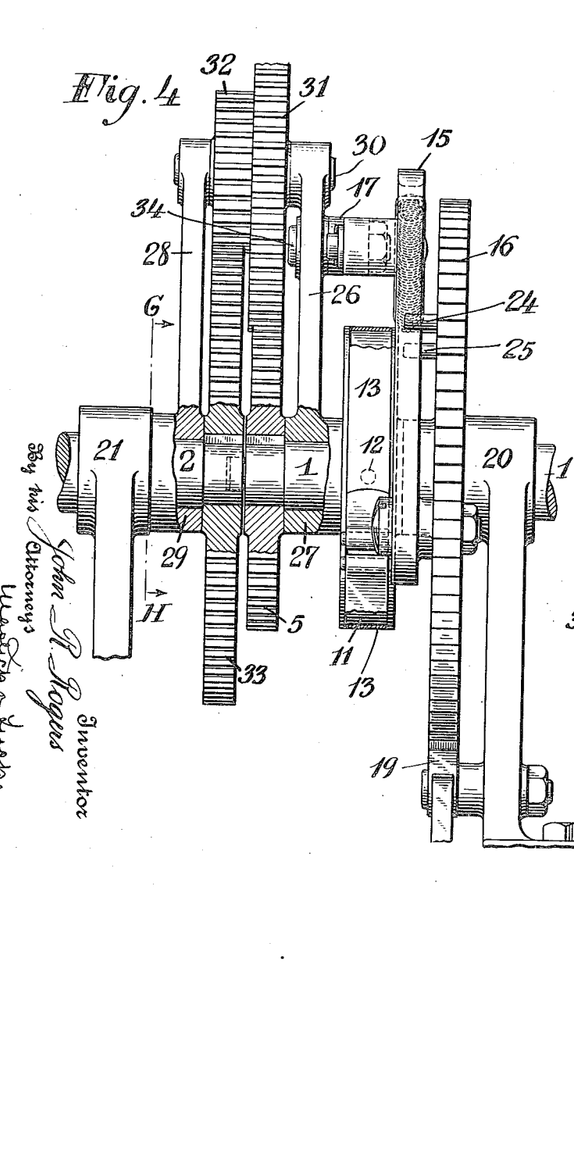
Fig. 4 is a side view of a modified form of device illustrating the practice of the principles of my invention, parts being broken away and parts being shown in section, wherein spur gears are used instead of an internal gear, as shown in Figs. 1 and 2.
Figure 5:
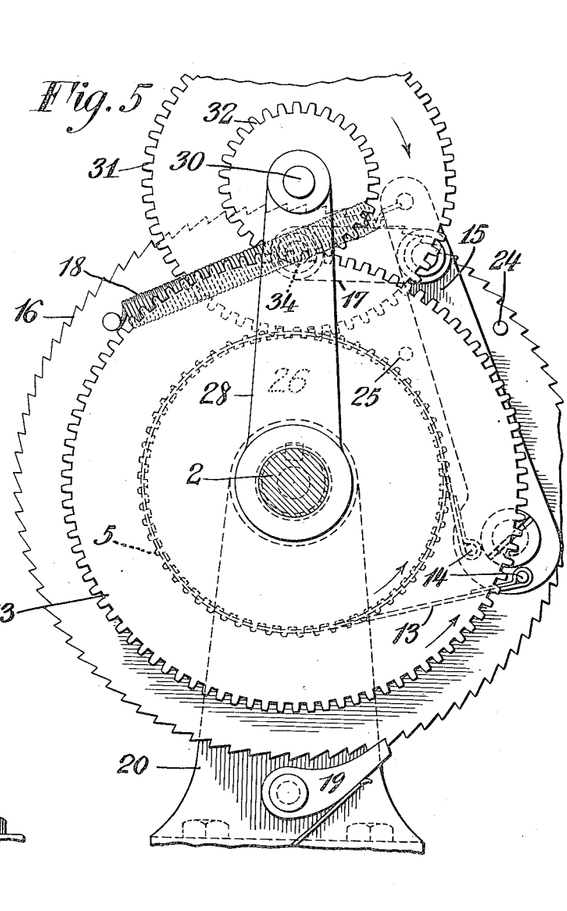
Fig. 5 is an end view of the device shown in Fig. 4 along the line G—H of Fig. 4 looking in the direction of the arrows, partly in section and parts being broken away.

In Figs. 4 and 5 I have shown a form of device substantially similar in construction and mode of operation to that shown in Figs. 1 and 2, excepting that external gears are used for the transmission instead of internal gears.

Referring now to Figs. 4 and 5, 26 indicates an arm (corresponding to arm 7 in Figs. 1 and 2) carried by a collar 27 loosely mounted on driving shaft 1. 28 indicates a corresponding arm carried by a collar 29 loosely mounted on driven shaft 2. The pin 30 having its bearings in the outer ends of arms 26 and 28 carries spur gears 31 and 32 rotatably mounted thereon, in mesh respectively with driving gear 5 and driven gear 33, driven gear 33 being mounted on and keyed to driven shaft 2. Link 17 is pivotally connected at one end to the upper end of lever 15, as described in connection with Figs. 1 and 2, and at the other end to arm 26 at a point indicated by 34 just below the bearing in arm 26 for pin 30. As illustrated I have omitted the reversing gear and the shifting means controlling the same, as such devices are readily understood and may be readily added by those skilled in the art.

The operation of the device shown in Figs. 4 and 5 is readily apparent from the description of operation of the device shown in Figs. 1 and 2. The only difference is that when running in "low gear" the driving gear 5 drives gear 31 in the direction of the arrow (Fig. 5) carrying gear 32 along with it. Gear 32 drives driven gear 33 in the direction of the arrow (Fig. 5) and in the same direction that gear 5 is turning. The ratio of power transmitted from the driving gear to the driven gear is in proportion to the respective sizes of the various gears and is here roughly shown as three to one. In Figs. 4 and 5 I have simply substituted the gears 31, 32 and 33 for the gears 9, 10 and 3 of Figs. 1 and 2, the operation of the remaining parts being as heretofore described in connection with Figs. 1 and 2.

Figure 6:
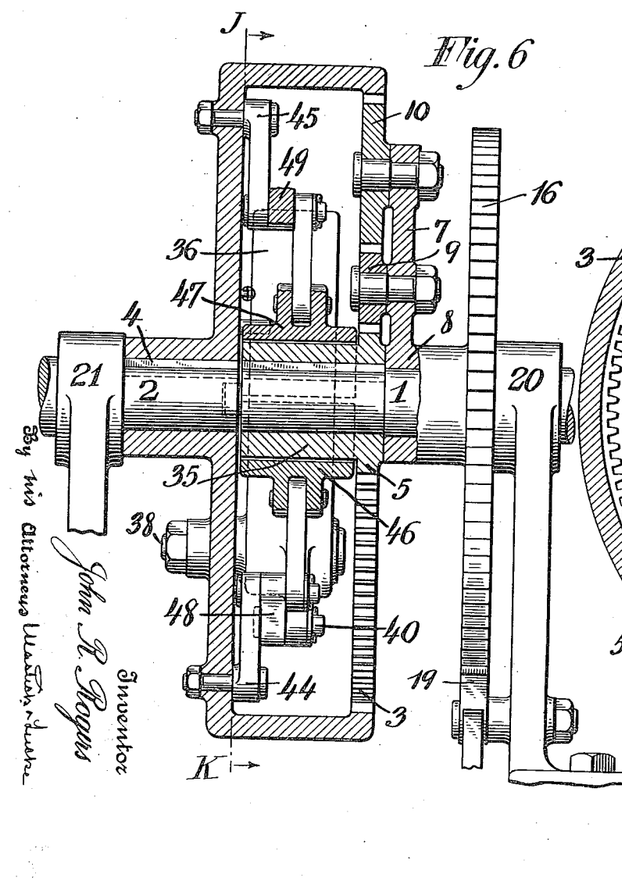
Fig. 6 is a side view, partly in section and partly broken away, of still another form of device illustrating the carrying out of the principles of my invention, wherein the centrifugal force of weights is used instead of the clutch employed in the devices shown in Figs. 1 and 2 and 4 and 5.
Figure 7:
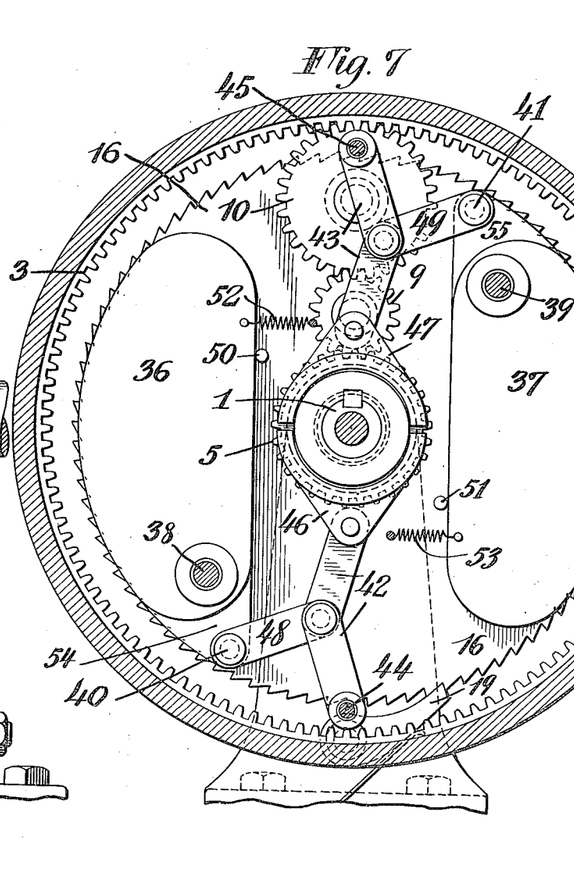
Fig. 7 is a cross-sectional view of the device shown in Fig. 6 along the line J—K looking in the direction of the arrows, parts being broken away.

In Figs. 6 and 7 I have shown a form of device substantially similar in construction and mode of operation to that shown in Figs. 1 and 2, excepting that the clutch device of said latter form is substituted by a device wherein the centrifugal force of weights is utilized.

Referring now to Figs. 6 and 7, 35 indicates a clutch disk fixedly mounted on driving shaft 1 and here shown as forming a hub or sleeve integral with driving gear 5. The internally toothed gear 3 is shown as being deeper than the corresponding gear in Figs. 1 and 2 for the purposes of accommodating large weights 36 and 37 which are pivoted to the inner face of gear 3 by means of pivot pins 38 and 39 respectively. The weights are shown as cut away at the end adjacent the pivot pins so as to form a seat for pivot pins 40 and 41 respectively. 42 and 43 indicate toggle joints pivoted at one end, as at 44 and 45 respectively, to the inner face of gear 3 and at the other end to shoes 46 and 47 respectively. Arms 48 and 49 are pivoted at one end to pivot pins 40 and 41 respectively and at the other to the hinge of the respective toggle joints. The weights 36 and 37 are normally held against stops 50 and 51 respectively by springs 52 and 53 respectively and when in this position they do not press upon or against the clutch disk 35. It will be noted that the weights 36 and 37 each form a lever the respective short arms 54 and 55 of which act, through arms 48 and 49 respectively, upon the respective toggle joints. The reaction-plate 16 is fixedly mounted on sleeve 8 which also carries arm 7 as before described.

The operation of the form of device shown in Figs. 6 and 7, so far the same differs from the operation of the form shown in Figs. 1 and 2 is as follows: When the device is started, for example in connection with an automobile, the action of the train of gears and the reaction-plate is the same as described in connection with said Figs. 1 and 2, that is to say, the train of gears drives the gear 3 at a ratio of approximately three to one. As the speed of gear 3 increases, the centrifugal force causes the weights 36 and 37 to leave stops 50 and 51 and through arms 48 and 49, straighten toggle joints 42 and 43 and press shoes 46 and 47 against clutch disk 35. In this form any tendency to reverse rotation of sleeve 8, and consequently arm 7, is prevented by pawl 19 taking into the teeth on the periphery of plate 16.

The action of the clutch device shown in Figs. 6 and 7 results in intermediate speeds and finally "direct drive" in precisely similar manner to that described in connection with Figs. 1 and 2.

I have omitted here also any illustration of reversing means for driven shaft 2 as such means may readily be supplied by anyone skilled in the art, particularly after reading the description of such means in connection with Figs. 1 and 2.

It will be noted that in the device as shown, the power of the driving shaft is transmitted to the driven shaft through two entirely separate and distinct mechanisms. The first one is represented by the clutch-band 13 and the second by the train of gears 5, 9, 10 and 3 (Figs. 1 and 2 and Figs. 6 and 7) and 5, 31, 32 and 33 (Figs. 4 and 5). It will also be noted that when the resistance of the driven shaft is comparatively slight, the entire power of the driving shaft is transmitted to the driven shaft through the clutch-band 13 and that the two shafts then revolve at the same speed. When the resistance is very great the power of the driving shaft is transmitted through the train of gears and the clutch-band 13 is entirely loose and at this time transmitting no power. When the resistance is intermediate, the clutch-band 13 slipping upon the clutch disk tends to turn the driven shaft at the same speed as the driving shaft, and the train of gears tends to turn the driven shaft at a speed proportional to the ratio of the teeth of the gears, the two acting together to drive the driven shaft at a speed intermediate between that obtained when the clutch-band 13 is tight and when it is entirely loose. It will be further noted that when the clutch-band 13 is tight the reaction of the resistance of the driven shaft is transmitted directly to the driving shaft, or in the case of an automobile the road resistance reacts directly against the power of the engine. When the clutch-band is entirely loose and the power is transmitted through the train of gears, the reaction of the driven shaft is transmitted to the driving shaft through the reaction plate 16 against pawl 19. At intermediate speeds or when the reaction plate 16 is traveling with the train of gears, the reaction of the driven shaft is transmitted to the engine through the friction of the clutch-band 13 against the drum. Or in the case of an automobile, the road resistance may be transmitted at times direct to the engine, at times direct to the reaction plate 16, and the pawl 19, and at other times against the friction of the clutch-band 13 on the drum.

From the foregoing it is obvious that any particular means of carrying out the principles of my invention is not essential to the object of the invention and that the mechanical details may be greatly varied without departing from the spirit of the invention. It is clear that the clutch action, instead of being applied to the primary driving gear may be applied to either of the intermediate driving gears, the essential feature being that the increase of the resistance on the driven shaft diminishes the clutch action and a decrease in the resistance of the driven shaft increases the clutch action until the drive becomes "direct". I have shown in Figs. 4 and 5 a modification of the gears as shown in Figs. 1 and 2, and in Figs. 6 and 7 a modification of the clutch means, in order to accent the fact that no particular form of construction is of essence and that the principles of the invention may be variously carried out. Other operative means will readily suggest themselves to those skilled in the art.

I, therefore, do not restrict myself to any of the forms or arrangements of apparatus as shown and described, or to any of the details of construction of such apparatus, further than the scope of the appended claims demand, the forms shown being simply illustrative of the broad principle, the essence of which is the automatic change of the gear ratio between the driving and the driven shaft, said change being caused by the increase or decrease of the resistance of said driven shaft. I believe myself to be the first to produce a mechanical device whereby an automobile, for example, may be driven entirely by means of the throttle and where the transmission device will automatically adjust itself so as to give, at all times, the greatest possible speed in proportion to the power developed by the engine, the greatest efficiency being thus automatically obtained.

I claim:

1. In a device for transmitting power, a driving shaft, a driven shaft and two mechanisms connecting them adapted to act coöperatively or separately, one of said mechanisms connecting the shafts to drive the driven shaft indirectly and the other of said mechanisms coöperating with the first mentioned mechanism to drive the driven shaft directly, the mode of action being governed by the resistance of the driven shaft.

2. In a device for transmitting power, a driving shaft, a driven shaft, two mechanisms connecting them adapted to act coöperatively or separately, one of said mechanisms connecting the shafts to drive the driven shaft indirectly and the other of said mechanisms coöperating with the first mentioned mechanism to drive the driven shaft directly, and automatic means governed by the resistance of the driven shaft for determining the mode of action of the mechanisms.

3. In a device for transmitting power the combination of a driving shaft, a driven shaft, gearing directly connecting them and means responsive to the variation of strain upon said gearing for automatically controlling the method of transmission of power by the gears from the driving shaft to the driven shaft.

4. In a device for transmitting power the combination of a driving shaft, a driven shaft, gears connecting them, means for displacing the axes of certain of said gears relatively to said shafts and means automatically responsive to said displacement for controlling the method of transmission of power by the gears from the driving shaft to the driven shaft.

5. In a device for transmitting power the combination of a driving shaft, a driven shaft, gears connecting them, means for displacing the axes of certain of said gears relatively to said shafts responsive to the variation of strain upon said gears and means responsive to said displacement for automatically controlling the method of transmission of power by the gears from the driving shaft to the driven shaft.

6. In a device for transmitting power the combination of a driving shaft, a driven shaft, a gear fixedly mounted on each of said shafts, a member rotatably mounted on one of said shafts, gears carried by said member and meshing with said fixedly mounted gears, means for displacing said member relative to the shaft on which it is mounted responsive to the variation of strain upon said gears and means responsive to said displacement for automatically controlling the method of transmission of power by the gears from the driving shaft to the driven shaft.

7. In a device for transmitting power the combination of a driving shaft, a driven shaft, gearing connecting them and a reaction mechanism, the reaction of said gearing through said mechanism automatically controlling the method of transmission of power by the gears from the driving shaft to the driven shaft.

8. In a device for transmitting power, the combination of a driving shaft, a driven shaft, gearing connecting them and means whereby the driving shaft may drive the driven shaft both directly and indirectly through said gearing at the same time.

9. In a device for transmitting power, the combination of a driving shaft, a driven shaft and automatic means for controlling the transmission of the power from the driving to the driven shaft either directly or indirectly, or both directly and indirectly at the same time.

10. In a device for transmitting power, a driving shaft, a driven shaft, means for transmitting the power from the driving to the driven shaft either directly or indirectly or both directly and indirectly at the same time, and means actuated by the resistance of the driven shaft whereby the mode of operation of said transmission means is automatically controlled.

11. In a device for transmitting power, a driving shaft, a driven shaft and means for transmitting the power from the driving to the driven shaft either directly or indirectly, or both directly and indirectly at the same time, the indirect driving means transmitting the power at a greater ratio than the direct and reacting against the direct driving means when the power is being transmitted both directly and indirectly at the same time.

12. In a device for transmitting power, the combination of a driving shaft, a driven shaft, a train of gearing between the driving shaft and the driven shaft arranged to drive the driven shaft indirectly at a greater ratio of power and at a lower speed than the driving shaft, and a clamping mechanism coöperating with the gearing and arranged to drive the driven shaft directly, from the driving shaft, the clamping mechanism and the gearing being so related that the entire power of the driving shaft may be transmitted to the driven shaft either directly or indirectly, or both directly and indirectly at the same time.

13. In a device for transmitting power, a driving shaft, a driven shaft, gearing connecting them, a clamping mechanism adapted to drive the driven shaft directly at the same speed as the driving shaft and an automatic device governed by the resistance of the driven shaft, controlling the clamping mechanism.

14. In a device for transmitting power, the combination of a driving shaft, a driven shaft, gearing connecting them and a reaction device loosely mounted on the driving shaft free to move in the direction of rotation of the driving shaft but restrained from movement in the opposite direction.

15. In a device for transmitting power the combination of a driving shaft, a driven shaft, gearing connecting them, a clutch on the driving shaft in operative connection with said gears, means for controlling the clamping of the clutch automatically responsive to the variation of strain on the gearing and a reaction device responsive to the clutch control.

16. In a device for transmitting power, the combination of a driving shaft, a driven shaft, a train of gears, and a member carrying said train of gears connecting the driving and the driven shafts, said member being adapted to rotate at the same speed as the driving shaft, at which time the gears do not revolve or at a lower rate of speed than the driving shaft, at which time the gears revolve or said member being capable of being stationary while the gears revolve.

17. In a device for transmitting power, the combination of a driving gear, a driven gear, a member loosely mounted to rotate adjacent the driving gear, gearing carried by said member capable of actuation by the driving gear to drive the driven gear in the direction of rotation of the driving gear at a greater ratio of power and a lower rate of speed than the driving gear when said member is at rest and means responsive to the variation of strain upon said gearing for rotating said member to cause the driving gear to drive the driven gear at the same ratio of power and rate of speed as the driving gear.

18. In a device for transmitting power the combination of a driving shaft, a driven shaft, gearing connecting them and a reaction mechanism capable of rotation, the reaction of said gearing through said mechanism automatically controlling the method of transmission of power by the gearing from the driving shaft to the driven shaft.

19. In a device for transmitting power, the combination of a driving shaft, a driven shaft, gearing connecting them and a reaction mechanism operatively associated with said gearing, whereby the proportion of power transmitted by said gearing from the driving shaft to the driven shaft is automatically controlled by the varying resistance of the driven shaft.

20. In a device for transmitting power, a driving shaft, a driven shaft, means for driving the driven shaft at the speed of the driving shaft, gearing connecting said shafts to drive said driven shaft at a lower speed but with greater power than the driving shaft and a reaction device against which said gearing may react when the power is entirely transmitted by said gearing.

21. In a device for transmitting power, the combination of a driving shaft, a driven shaft, gearing connecting them, a reaction mechanism operatively associated with said gearing, means for holding said reaction mechanism against rotation when the resistance to the driven shaft is great and permitting the rotation of said reaction mechanism at the speed of the driving shaft when the resistance to the driven shaft is slight, and means for rotating said reaction mechanism at a speed less than the speed of the driving shaft when the resistance is intermediate said first-mentioned resistances.

22. In a device for transmitting power, the combination of a driving shaft, a driven shaft, gearing connecting said driving and driven shafts, a clamping mechanism and a reaction mechanism operatively associated with said gearing and clamping mechanism.

23. In a device for transmitting power, the combination of a driving shaft, a gear thereon, a driven gear, gearing connecting said gears and a reaction mechanism rotatable with reference to said shaft and associated with said last mentioned gearing.

24. In a device for transmitting power, the combination of a driving shaft, a driven shaft, gearing connecting them, a reaction mechanism carrying said gearing and a clamping mechanism controlled by said reaction mechanism.

25. In a device for transmitting power, the combination of a driving shaft, a driven shaft, gearing between them capable of angular displacement relative to the driving shaft, a clamping mechanism and a device for controlling the operation of the clamping mechanism in turn controlled by the movement of the gearing relative to the driving shaft.

26. In a device for transmitting power the combination of a driving shaft, a driven shaft, gearing connecting them mounted to be carried about said driving shaft at the speed of said driving shaft when the gears are not rotating upon their axes, means for holding the member carrying said gears against swinging about said driving shaft when said gears are transmitting all the power, said means being adapted to perform both functions at the same time.

27. In a device for transmitting power, the combination of a driving shaft, a driven shaft, gearing connecting them mounted to be carried about said driving shaft at the speed of the driving shaft when the gears are not rotating upon their axes, means for holding the member carrying said gearing against swinging about said driving shaft when the gears are transmitting all the power, said means being adapted to perform both functions at the same time and means for angularly displacing said gearing relative to the driving shaft, the action of said gearing relatively to the driving shaft being controlled by the extent of said angular displacement.

28. In a device for transmitting power, the combination of a driving shaft, a driving gear mounted thereon, a driven shaft, a driven gear mounted thereon, an arm loosely mounted on the driving shaft, a train of gears carried by said arm, one of said train of gears meshing with said driving gear and another of said gears meshing with the driven gear to drive the driven gear in the direction of rotation of the driving gear at a less rate of speed than the speed of the driving shaft, a reaction-plate loosely mounted on the driving shaft free to move in the direction of rotation of the driving gear but restrained from movement in the opposite direction and means automatically controlled by the resistance of the driven shaft for locking said arm and said reaction-plate together to drive the driven gear at the same rate of speed as the driving gear.

29. In a device for transmitting power, the combination of a driving shaft, a driving gear mounted thereon, a driven shaft, a driven gear mounted thereon, an arm loosely mounted on the driving shaft, a train of gears carried by said arm, one of said train of gears meshing with said driving gear and another of said gears meshing with the driven gear to drive the driven gear in the direction of rotation of the driving gear at a less rate of speed than the speed of the driving shaft, a reaction-plate loosely mounted on the driving shaft free to move in the direction of rotation of the driving gear but restrained from movement in the opposite direction, a clutch disk secured to the driving shaft, a clutch band, means pivotally mounted on the reaction plate for controlling the pressure of the clutch band on the clutch disk and means connecting said last named means and said arm whereby the movement of said arm actuates the clutch band controlling means to vary the pressure of the clutch band against the clutch disk in proportion to the resistance of the driven shaft, the driven shaft being driven at the same rate of speed as the driving shaft when said clutch band is locked against the clutch disk.

30. In a device for transmitting power, the combination of a driving shaft, a driving gear mounted thereon, a driven shaft, a driven gear mounted thereon, an arm loosely mounted on the driving shaft, a train of gears carried by said arm, one of said train of gears meshing with said driving gear and another of said gears meshing with the driven gear to drive the driven gear in the direction of rotation of the driving gear at a less rate of speed than the speed of the driving shaft, a reaction-plate loosely mounted on the driving shaft free to move in the direction of rotation of the driving gear but restrained from movement in the opposite direction, a clutch disk secured to the driving shaft, a lever pivotally secured to the reaction plate, a clutch band secured to one arm of said lever, a link connecting the free end of said lever and the free end of said arm and a spring connecting the free end of said lever and said reaction plate, the relationship of the parts being such that the increase of the resistance of the driven shaft decreases the pressure of the clutch band on the clutch disk and the decrease of the resistance of the driven shaft increases said pressure so that when the clutch band and clutch disk are locked together the driven shaft is driven at the same rate of speed as the driving shaft.

31. In a device for transmitting power, the combination of a driving shaft, a driven shaft, a train of gears connecting said shafts to drive the driven shaft in the same direction of rotation as the driving shaft at a greater ratio of power and a less rate of speed than the driving shaft, means automatically controlled by the resistance of the driven shaft to lock said train of gears to drive the driven shaft at the same rate of speed as the driving shaft and to carry said train of gears around the driving shaft during rotation of said gears to effect a speed of said driven shaft intermediate said two rates of speed.

In testimony whereof I have signed this specification in the presence of two subscribing witnesses.

JOHN R. ROGERS.

Witnesses:
SEABURY C. MASTICK,
K. G. LEARD.